United States Patent Office 2,877,813
Patented Mar. 17, 1959

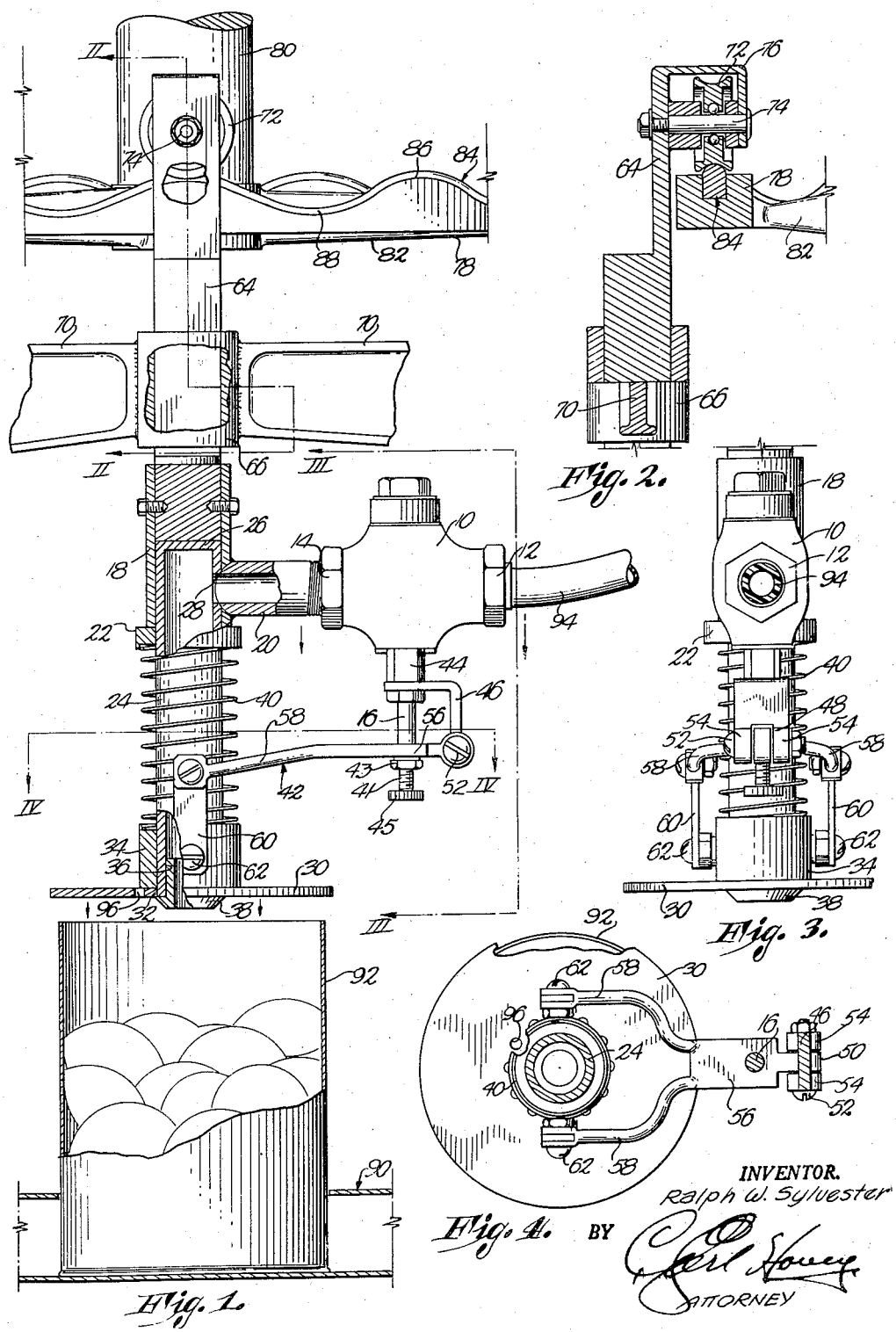

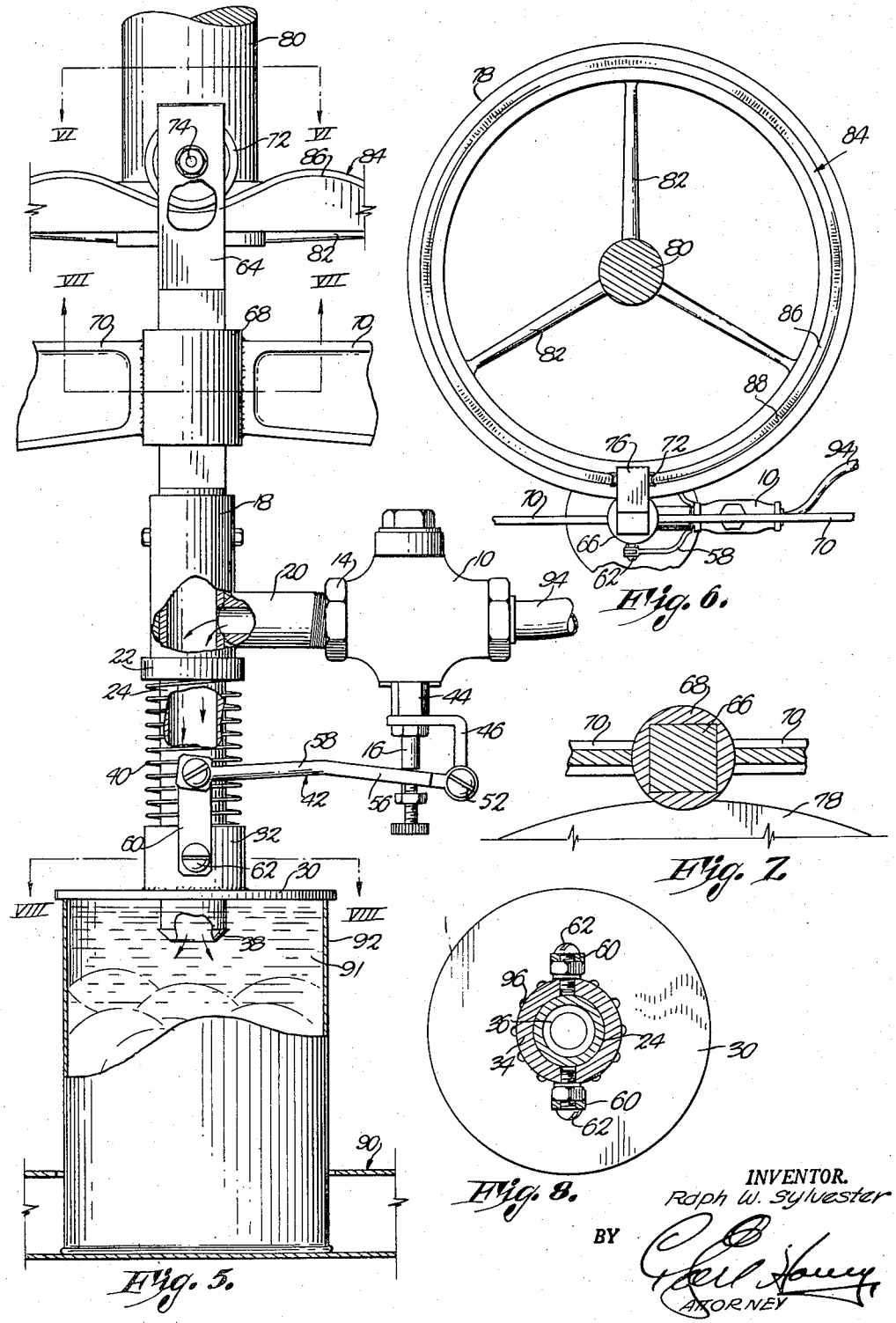

2,877,813

FILLING VALVE ASSEMBLY FOR CANNING MACHINE

Ralph W. Sylvester, Independence, Mo., assignor to A. Reich & Sons, Inc., Kansas City, Mo., a corporation of Missouri Application July 1, 1957, Serial No. 669,259

7 Claims. (Cl. 141—250)

This invention relates generally to apparatus for filling containers with fluid and, more specifically, to an assembly including a valve for automatically delivering a predetermined quantity of liquid into cans as the latter are successively moved into position in a canning machine.

Can closing and sealing machines have been known and utilized for many years in those industries where a product is initially placed in a container and then vacuum sealed, and automatic filling machines have also been used to some extent to place the product in the container prior to the sealing operation. However, automatic filling machines have not been completely satisfactory, especially in the canning industry wherein products such as foods are sealed in cans, because of the high initial cost of the machinery and the extreme complexity thereof leading to expensive maintenance, repair and operation requiring skilled workmen. The principal problems encountered with respect to automatic filling of containers with liquids relate to the fact that with some types of filling apparatus, the can may not be adequately filled; with others the can may be filled to the point where the liquid overflows; or the liquid filling material may be released when no can is present at the dispensing station.

Several general types of can closing and sealing machines have been suggested, one of which includes a rotatable table having a plurality of container-receiving openings in the periphery thereof and wherein there is provided means for intermittently rotating the table so that containers disposed in the openings are successively moved to a closing station where the container is either closed or sealed or both. Manifestly, mechanical means is usually provided to place on and remove containers from the table as the latter intermittently rotates. Also usually associated with the closing and sealing machine is a rotatable cam member which actuates the closing and sealing structure as the table rotates and it can be appreciated that different types of cams can be provided, one such type being a wheel having a cam surface thereon and which rotates continuously to actuate the closing structure as the table is intermittently rotated.

In another machine, the cam may also rotate continuously with the table and include an eccentric for actuating the closing structure and, in another machine, the table, the closing structure and the cam actuating means may all be rotatable, either continuously or intermittently, about a common vertical axis. By the same token, an elongated conveyor belt may be utilized in lieu of the rotatable table and also, either a portion of the table or the belt can be constructed to move toward the closing apparatus at the closing station.

Automatic filling machines incorporating some of the above mentioned features have been previously disclosed but have suffered from the disadvantages above outlined as well as requiring structure completely independent of the closing and sealing machine.

It is, therefore, the most important object of this invention to provide an assembly including a valve for automatically delivering a predetermined quantity of liquid to a container only when a container is located at a particular dispensing station.

It is an equally important object to provide such an assembly which is to be adapted to be placed on a conventional can closing and sealing machine and be operated thereby to fill the container prior to closing and sealing of the same.

A further important object of this invention relates to the provision of a filling assembly including a valve and adapted to be placed on a closing and sealing machine wherein the valve is adapted to be actuated by the same means which actuates the closing and sealing structure.

An important object relates to the provision of an assembly including a valve wherein shiftable means is connected to the valve and positioned so that when a container is at the dispensing station, the means engages the container upon movement of the latter relative to the assembly to thereby open the valve and deliver liquid to the container.

An additional important object is to provide a filling assembly including a valve which is adapted to deliver liquid into a container disposed at the dispensing station wherein the valve body itself is shiftable toward and away from the dispensing station and movable relative to means connected to the valve within the body so that the valve is opened to deliver fluid to the container only when the same is disposed at the station.

Another important object of this invention is to provide a valve assembly as above wherein there is provided an upright delivery tube connected to the shiftable valve in a position to deliver the fluid into the container, and an elongated extension secured to the uppermost end of the delivery tube which has means thereon engageable with cam means, so as to reciprocate the valve body and the delivery tube with respect to the container while the same is disposed at the dispensing station, there being means connected to the valve within the body adapted to engage the container so that the valve body reciprocates relative to the means, thereby opening the valve and delivering fluid into the container.

Also an important object of this invention relates to a valve assembly as described wherein the cam means includes a roller on the uppermost end of the extension and which rides on a cam track having alternately raised and valley portions so that, as the cam track is moved, the extension and in turn the valve and delivery tube thereon move toward and away from the dispensing station and thereby actuate the valve to deliver fluid into the container.

Other important objects of the instant invention relate to the provision of an annular plate secured to means for actuating the valve within the body which has a central opening reciprocably receiving the delivery tube in a manner so that the plate engages the uppermost edge of the container and the delivery tube shifts with respect to the plate, thereby opening the valve and delivering fluid into the container; to the provision of a series of perforations in the annular plate so as to allow air to escape from the container as the latter is being filled with fluid; to a flexible conduit connected to the valve body and which is adapted to be connected to a source of supply of the fluid under pressure, whereby the valve body may reciprocate relative to the supply source; to a spring interposed between a flange on the delivery tube and the plate so as to bias the tube and the plate in opposite directions; to the provision of mechanism for operating the cam means in conjunction with the apparatus for intermittently and successively moving containers into the dispensing station so that the dispensing valve is reciprocated as the cans are moved into the dispensing station; and other objects and details of construction which will become apparent or be described more fully hereinafter.

In the drawings:

Figure 1 is a fragmentary, side elevational view of a valve assembly constructed in accordance with the instant invention, certain parts being broken away and in section to reveal details of construction;

Fig. 2, Fig. 3 and Fig. 4 are cross-sectional views taken on the lines II—II, III—III, and IV—IV, respectively, of Fig. 1;

Fig. 5 is a fragmentary, side elevational view similar to Fig. 1 and illustrating the valve and delivery tube thereon in another position during operation of the canning machine; and Figs. 6, 7 and 8 are cross-sectional views taken on the lines VI—VI, VII—VII, and VIII—VIII, respectively, of Fig. 5.

A valve assembly constructed in accordance with the concepts of the instant invention and adapted to be mounted on a closing and sealing machine so as to form a part thereof is illustrated in the drawings and includes a valve body 10 which has an inlet 12, an outlet 14, and a reciprocable valve therein (not shown) which is shiftable by virtue of an elongated, substantially vertical sleeve 16 connected thereto and extending downwardly from body 10. A hollow, substantially L-shaped conduit 18 having a laterally extending line 20 thereon is secured to body 10 by virtue of line 20 being suitably threaded into the outlet 14 of body 10, and conduit 18 is provided with an outwardly extending, external, annular flange 22 secured to the lowermost end thereof.

Telescoped within the open lowermost end of conduit 18 and secured thereto is a delivery tube 24 having a wall 26 closing the uppermost end thereof, tube 24 extending downwardly from conduit 18 a substantial distance. As shown in Figs. 1 and 5, there is an opening 28 in the side wall of tube 24 communicating with the passage through line 20.

An annular plate 30 is disposed below conduit 18 and the central opening 32 of plate 30 reciprocably receives the lowermost end of tube 24. Secured to the uppermost face of plate 30 in circumscribing relationship to opening 32 and having a diameter substantially equal thereto is a sleeve 24 which also reciprocably receives tube 24. A tubular part 36 is telescoped within the lowermost open end of tube 24 and a frusto-conical flange 38 integral with the lowermost end thereof which has a larger diameter than the diameter of opening 32 prevents displacement of plate 30 from the lowermost end of tube 24 but does not interfere with reciprocation of plate 30 upwardly on tube 24. A spring 40 surrounds the lowermost portion of tube 24 and bears at opposite ends thereof against flange 22 and sleeve 34 respectively.

Structure for shifting sleeve 16 and broadly designated by the numeral 42 is pivotally secured to the lower bearing 44 which reciprocably receives sleeve 16 by virtue of one end of structure 42 being pivotally mounted on the lowermost part of an L-shaped bracket 46 which is mounted on bearing 44. As shown in Figs. 3 and 4, the vertical leg of bracket 46 has a notch 48 therein receiving perforated tongue 50 on one end of the structure 42, there being bolt and nut means 52 passing through tongue 50 and extensions 54 forming notch 48 so that structure 42 is swingable with respect to body 10. Structure 42 comprises a rectangular, relatively flat portion 56 integral with tongue 50 and a pair of spaced, bent rods 58 which receive tube 24 therebetween. Pivotally secured to the outermost end of each of the rods 58 is a normally vertical, elongated link 60 which is in turn pivotally secured by screws 62 to the sleeve 34. Rod 41 reciprocably received within sleeve 16 passes through portion 56 of structure 42 and is suitably threaded to receive a rotatable washer 43 normally disposed below the lowermost surface of portion 56. A knurled knob 45 is provided on the lowermost end of rod 41.

Telescoped within the uppermost end of conduit 18 and bearing against wall 26 is an elongated element 64 which has a square portion 66 intermediate the ends thereof which is reciprocably received within a bearing 68 held in position by suitable, oppositely extending webs 70 welded thereto. A roller 72 is rotatably mounted on the uppermost end of element 64 by virtue of pivot means 74 which passes through element 64 and the vertical leg of a substantially L-shaped bracket 76 integral with the uppermost end of element 64.

The substantially horizontal ring 78 located adjacent the uppermost end of element 64 and secured to vertical shaft 80 of the machine so as to be rotatable therewith is normally provided thereon to operate the closing and sealing structure. Ring 78 is secured to shaft 80 by virtue of spiders 82, and a cam track broadly designated by the numeral 84 is provided on the uppermost peripheral edge of ring 78, it being seen that roller 72 is located in a position where the same may ride on track 84. As shown in Figs. 1 and 5 inclusive, cam track 84 includes a series of alternate raised portions 86 and valleys 88 in a position so that as the roller 72 rides thereon, the element 64, tube 24 and body 10 are reciprocated on a substantially vertical path of travel.

Apparatus, broadly designated 90 and which may comprise a rotatable table, is disposed below tube 24 and plate 30 for intermittently and successively moving a series of containers 92 into position at a dispensing station below the tube 24 and plate 30. The plate 30 is of greater diameter than the diameter of the uppermost edge of container 92 so that, upon reciprocation of the assembly, plate 30 engages the edge of container 92. It can now be appreciated that as apparatus 90 is intermittently rotated, liquid is initially directed into container 92, and then as the latter continues to rotate to another station, the container is closed and sealed.

A conduit 94 of flexible material is coupled to the inlet 12 of body 10 and is adapted to be connected to a suitable source of fluid 91 maintained under pressure. Also, a series of openings 96 are provided in plate 30 and disposed circumferentially with respect to sleeve 34.

*Operation*

As containers 92 are moved into the dispensing station by apparatus 90, means is provided for rotating ring 78 at a speed correlated with intermittent movement of containers 92 so that the valve assembly is actuated at the moment the can 92 is received at the dispensing station. The structure for rotating wheel 78 at the desired speed may be timed so that at the moment one of the containers 92 is moved into the dispensing station, the roller 72 rides from the raised portion 86 into a valley 88 so as to permit the element 64, tube 24 and body 10 thereon to move downwardly toward the container 92 which is disposed in the dispensing station. As tube 24 shifts downwardly, the plate 30 engages the uppermost edge of container 92, thereby shifting tube 24 relative to plate 30. Relative reciprocation of plate 30 with respect to tube 34 causes structure 42 to swing relative to body 10, thereby moving sleeve 16 upwardly in body 10 and opening the valve contained in body 10, whereupon fluid 91 is permitted to flow through body 10 and be delivered from tube 24 into container 92. Then, as ring 78 continues to rotate, roller 72 rides along cam track 84 to a position on raised portion 86 to reciprocate element 64 and tube 24 upwardly and cause the tube 24 to shift relative to plate 30 into a position as shown in Fig. 1. The lowermost end of the path of travel of tube 24 and element 64 is shown in Fig. 5 of the drawings wherein roller 72 is disposed in valley 88. It can be appreciated that if a can is not moved into position at the dispensing station as ring 78 rotates and roller 72 moves into valley portion 88, fluid 91 is not dispensed from tube 24 because as the valve assembly moves downwardly toward the dispensing station, plate 30 does not engage the uppermost edge of a container so as to shift structure 42 with respect to body 10 to open the valve therein and permit fluid 91 to be discharged therefrom.

By virtue of the provision of washer 43 threadably mounted on rod 41, the amount of substance delivered from valve 10 is variable at will and only measured quantities of fluid 91 will be delivered into container 92, depending upon the disposition of washer 43 with respect to knob 45.

Also because of the provision of openings 96 in plate 30, air is permitted to escape from container 92 as fluid 91 is directed into container 92 while cover 30 is disposed over the uppermost end of container 92. It is desirable to introduce a hot liquid 91 into container 92 so that upon closing and sealing of the latter a vacuum is created in the container 92 upon cooling of the same.

Although the present invention has been described and illustrated as adapted to be mounted on and form a part of a closing and sealing machine, it is apparent that a machine including all of the necessary components described can be provided which operates completely independent of a closing and sealing machine. Furthermore, it can be seen that the operation of the machine is not exactly limited to that described because, as heretofore indicated, an elongated conveyor can be utilized in lieu of rotatable table 90, eccentric means can be substituted in lieu of wheel 78, the cam wheel 78 can be rotated intermittently, the entire assembly can be constructed to rotate about a vertical axis, and the structure upon which the container 92 is disposed can be caused to move toward valve 10 rather than the latter shifting toward container 92

Having thus described the invention what is claimed as new and desired to be secured by Letters Patent is:

1. In an assembly for delivering a quantity of fluid substance into a container disposed at a designated station, a substance dispensing valve body adapted to be connected to a source of supply and having a valve therein; reciprocable actuating structure coupled with said valve; an elongated, upright delivery tube connected to said body for directing substance delivered from the body into a container when the latter is at said station; an elongated arm swingably coupled with said structure; a plate pivotally secured to the arm for swinging the latter to open the valve, said plate having a central opening therein reciprocably receiving the lowermost end of the tube; an elongated upright extension secured to the uppermost end of the tube; and cam mechanism intermittently engageable with said extension for shifting the body toward and away from said station, the plate being adapted to engage the uppermost end of the container during reciprocation of the body whereby the tube and body are shifted relative to the plate in a manner to open the valve and thereby deliver substance to the container while the latter is disposed at said station.

2. An assembly as set forth in claim 1 wherein there is provided a circumferential flange on said tube and spring means on the tube interposed between said flange and the plate for biasing the flange and plate in opposite directions.

3. An assembly as set forth in claim 1 wherein there is provided a flexible inlet conduit connected to the body and adapted for connection to said source of supply.

4. In an assembly for delivering a quantity of fluid substance into a container disposed at a designated station, a substance dispensing valve body adapted to be connected to a source of supply and having a valve therein; movable actuating structure coupled with said valve; an elongated, upright delivery tube connected with the valve for directing substance delivered from the body into a container when the latter is at said station; an elongated upright extension secured to the uppermost end of the tube; a component swingably secured to said structure for moving the same; apparatus disposed below the tube for intermittently moving one of a series of containers to said station at spaced intervals of time; and mechanism including cam means engageable with said extension for shifting the latter and in turn the valve body and said tube thereon toward and away from said station when one of the containers is at said station, the component being adapted to engage said one container during reciprocation of the body and tube whereby the body shifts relative to said component in a manner to open the valve and thereby deliver substance to the container while the latter is at said station.

5. An assembly as set forth in claim 4 wherein there is provided a roller on said extension which rides on said cam means.

6. An assembly as set forth in claim 5 wherein said cam means includes a substantially horizontal, rotatable wheel having an uppermost, peripheral cam track upon which the roller rides, said track having a series of alternate raised portions and valley portions.

7. An assembly as set forth in claim 6 wherein the rotation of said wheel is correlated with said apparatus so that the roller is disposed in one of the valley portions of the track when said one container is at said station to permit the body and tube thereon to move toward said station and relative to said component engaging the container to thereby deliver substance to the same.

References Cited in the file of this patent

UNITED STATES PATENTS

| | | |
|---|---|---|
| 1,438,483 | Garrett | Dec. 12, 1922 |
| 2,168,380 | Winton | Aug. 11, 1939 |
| 2,530,755 | Bingham | Nov. 21, 1950 |
| 2,592,846 | Ayars | Apr. 15, 1952 |